June 20, 1933. W. GOETZELMAN 1,914,635
CONDUIT CLAMP FOR CONNECTING BOXES
Filed June 1, 1931
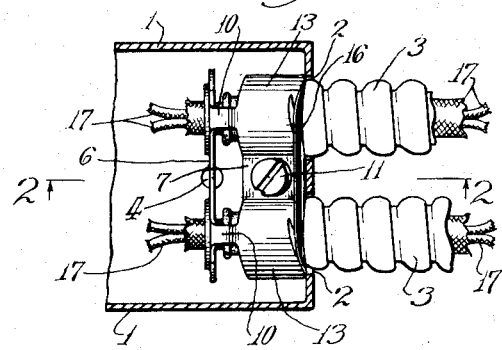
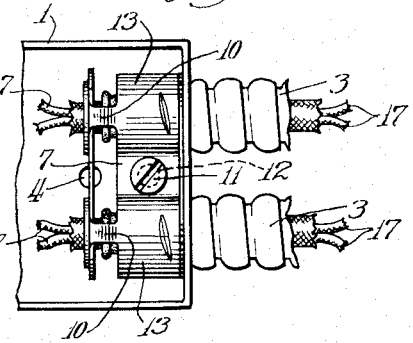
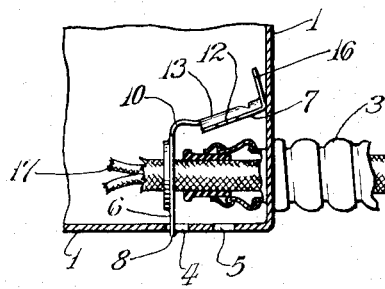
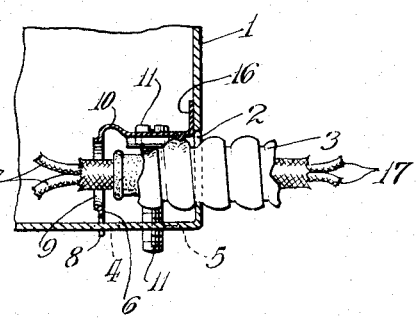
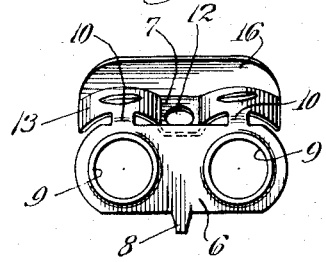
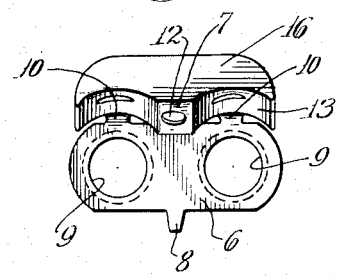

Patented June 20, 1933

1,914,635

UNITED STATES PATENT OFFICE

WILLIAM GOETZELMAN, OF CHICAGO, ILLINOIS, ASSIGNOR TO APPLETON ELECTRIC COMPANY, A CORPORATION OF ILLINOIS

CONDUIT CLAMP FOR CONNECTING BOXES

Application filed June 1, 1931. Serial No. 541,326.

The present invention has for its object to produce a simple and novel clamp adapted to be located in a connection box or the like for the purpose of securely holding the incoming end or ends of a conduit or conduits without interfering with conductors leading out from the conduit or conduits.

In carrying out my invention, I form a clamping member composed of two wings, one of which stands at right angles to a wall parallel to the incoming conduits while the other wing is adapted to engage with the conduits and also with the wall through which the conduits pass. The parts are so constructed that the second wing, which constitutes the actual clamping element, initially stands at such an angle to the other wing that the conduit or conduits may be moved in or out without encountering the clamping wing; but, when the clamping wing is drawn down by means of a screw to engage the conduit, this is accomplished without moving the other wing and, therefore, without danger of causing the latter wing to press on the wires that extend from the conduit or conduits through the same. Furthermore, the clamping wing is provided with a flange that serves to cover any exposed part of the opening or openings through which the conduits pass, provided the diameter of the openings is greater than the diameter of the conduits. I am able to adjust the clamping wing in the manner just described by connecting the two wings together through narrow strips that will bend when the clamping wing is swung from a position in which it makes an obtuse angle with the other wing to a position in which the two wings are at right angles to each other, or more nearly so. Furthermore, these bendable strips space the wings apart from each other so as to leave openings or windows through which the underlying conduits or conductors may be viewed.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a section through a connection box at two openings through which a pair of conduits enter the box, one of my improved clamping devices being in a box to be drawn down into clamping relation to the conduits; Fig. 2 is a section on line 2—2 of Fig. 1; Fig. 3 is a view similar to Fig. 1, excepting that the box is shown in elevation with the cover removed, and the clamping device is shown as having been drawn into its clamping position; Fig. 4 is a view similar to Fig. 2, illustrating the clamp in the condition in which it appears in Fig. 3; Fig. 5 is an end view of the clamping plate, looking at it from the left-hand side of Fig. 2; and Fig. 6 is a view of the opposite end of the clamping plate from that shown in Fig. 5.

In the drawing I have illustrated my invention as embodied in a device adapted simultaneously to clamp the ends of two conduits to a box and, for the sake of brevity, the detailed description will be confined to this particular embodiment.

Referring to the drawing, 1 represents a connection box or other box having in one of the side walls, just above the bottom, two round holes 2 through which the ends of conduits, such as indicated at 3, may be inserted. In the bottom wall of the box, midway between the openings 2, 2, and a short distance from the wall in which these openings lie, is a small hole 4. Between the hole 4 and the wall containing the holes 2, 2 is a screw-threaded hole 5. The hole 4 is adapted to receive a tongue or projection on my improved clamping device to anchor one end of the device, whereas the hole 5 is adapted to receive the end of a screw or bolt extending down from the clamping device for the purpose of drawing the clamping device into its locking position and holding it there.

The clamping device may be made of any suitable material and any desired number of parts, but it is preferably constructed of a single piece of sheet metal cut and bent into the proper shape. The clamping device is composed of two main wings 6 and 7; the wing 6 having at the middle of one long edge a projecting tongue 8 that is set into the hole 4, and having therein also two large holes 9, 9 through which conductors may be led. This wing is adapted to remain at right angles to the bottom wall in the box and parallel with the side wall which it faces. The two wings are connected together by means of narrow strips 10, 10 extending from the upper edge of the wing 6 to the adjacent edge of the other wing. The parts are so formed that initially the two wings form an obtuse angle with each other, as indicated in Fig. 2; the width of the wing 7 and the length of the connecting strips 10 being such that the free long edge of the wing 7 will engage with the inner face of the side wall of the box when the clamping device is placed in position. The connecting strips are bowed outwardly so that, when the upper wing is forced down into parallelism with the bottom wall of the box, the strips can yield by being bent still further, so that the upright wing of the clamping device need not be tilted out of its upright position. The drawing down of the upper wing is accomplished by means of a long screw 11 passing through a hole 12 at about the middle of the upper wing; this screw engaging with the screw threads in the hole 5 in the bottom of the box. The end portions of the wing 7 are preferably curved or bowed, as indicated at 13, so as to cause them to fit over a pair of conduits, such as indicated at 3, 3, when the upper wing is drawn down upon the conduits.

As will be seen from Fig. 4, a conduit may not completely fill the opening through which it passes into the box. It is not desirable that the area of the opening thus left unoccupied by the conduit be left uncovered. To avoid this, I provide the clamping wing 7 with a flange 16 rising from its long free edge at right angles to the body portion of this wing. When the clamping device is first set into the box, as shown in Fig. 2, this flange is inclined upwardly and inwardly from the adjacent wall of the box. However, when the clamping wing is drawn down, the flange is laid flat against the side of the box, as shown in Fig. 4, forming the closure for the empty parts of the openings 2 above the conduits which have been forced by the clamping device into the lowermost parts of these openings. It will be seen that the metal of the box bounding the lower parts of the openings 2 will enter the grooves in the ordinary flexible conduits, so that, when the clamping wing has been drawn down, it is impossible to withdraw the conduits. It will be seen that, after the clamping wing 7 has been swung around at right angles to the other wing, it will move down thereafter without changing this angular relation, the flange sliding along the wall of the box against which it lies flat and the connecting strips yielding sufficiently to permit the adjacent marginal portion of the upper wing to move down in unison with the side engaged with the wall of the box. Consequently, there is no tendency to bend the inwardly projecting ends of the conduits which are subjected simply to compression and shearing stresses.

Conductors 17, extending out from the inner ends of the conduits, pass through the large holes 9 in the upright wing of the clamping plate. Since these holes are large, and the upright clamping plate does not change its position during the fastening of the clamp upon the conduits, there will be no danger of cramping the conductors or of gripping them or placing them under pressure in any way.

In assembling the parts, the clamp may be loosely secured in the box by the screw, the conduits being then inserted and the conductors passed through the holes in the upright wing of the clamp. If the angle between the wings is acute, the wing 7 will not interfere with the entrance of the conduits into the box even though the conduits are of the largest size that can pass through the holes. Where the conduits are smaller than the holes in the box, a clamp in which the two wings stand at right angles to each other, either because the clamp has been bent into this shape or was so formed in the manufacture of the same, will serve equally well.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. A clamping member for securing a conduit or the like to a box through a wall of which it enters, comprising two wings arranged at an obtuse angle to each other, short narrow bendable elements extending between and connecting said wings together at the angle of said member and holding the adjacent edges of the wings apart from each other, one of the wings having therein at least one opening to permit conductors to be passed through the same, and the other wing having an opening to receive a bolt or the like.

2. A clamping member for securing a conduit or the like to a box through a wall of which it enters, comprising a piece of sheet metal cut and bent along a transverse line to form two wings lying at an obtuse angle to each other, the inner edge of one wing being spaced apart from the second wing and being connected thereto by narrow strips, said second wing having openings therethrough to permit the passage of conductors, and the other wing having a hole for receiving a fastening.

3. A clamping member for securing a conduit or the like to a box through a wall of which it enters, comprising a piece of sheet metal cut and bent along a transverse line to form two wings lying at an obtuse angle to each other, the inner edge of one wing being spaced apart from the second wing and being connected thereto by narrow strips, said strips being bowed outwardly, said second wing having openings therethrough to permit the passage of conductors, and the other wing having a hole for receiving a fastening.

4. A clamping member for securing a conduit or the like to a box through a wall of which it enters, comprising a piece of sheet metal cut and bent along a transverse line to form two wings lying at an obtuse angle to each other, the inner edge of one wing being spaced apart from the second wing and being connected thereto by narrow strips extending transversely of the aforesaid edge, said second wing having openings therethrough to permit the passage of conductors, the other wing having a hole for receiving a fastening element and having also a projecting flange at the free edge opposite that to which said strips are joined.

5. A clamping member for securing a conduit or the like to a box through a wall of which it enters, comprising a piece of sheet metal cut and bent along a transverse line to form two wings lying at an obtuse angle to each other, the inner edge of one wing being spaced apart from the second wing and being connected thereto by narrow strips, the first wing being perforated to receive a fastening element and having a flange extending therefrom and at right angles thereto in a direction giving a Z-shape to the device, said second wing having openings therethrough to permit the passage of conductors and having also a projecting tongue at the free edge opposite that to which said strips are joined.

6. A clamping member composed of two connected wings arranged at an angle to each other, one of the wings being adapted to be set on edge upon and at right angles to a wall of a box or the like, the second wing having at its free edge a flange at right angles thereto, said flange being adapted to lie flat against a second wall of the box at right angles to the first wall, and the connecting means between said wings spacing said wings apart and being yieldable to permit said second wing to be moved bodily down the wall with which it engages while holding the first wing immovable with respect to that wall.

7. The combination with a box having an opening through one wall near a second wall at right angles thereto, of a clamping plate composed of two wings making an obtuse angle with each other, said plate being adapted to be placed in the angle between said walls with the free edge of one wing resting against the second wall and the free edge of the second wing resting against the first wall, outwardly-bowed bendable means joining the other long edges of the wings while holding them spaced apart, said second wing having at its long free edge a flange extending at right angles thereto, and means interposed between said second wall and the second wing to swing that wing into parallelism with said second wall.

8. In combination, a box having in one wall near a second wall an opening for the passage of a conduit, said second wall having therein a small hole at some distance from the first wall and also a screw-threaded hole between said small hole and the first wall, a clamp member having a wing adapted to rest on said second wall at right angles thereto and having a tongue entered in said small hole, said clamp member having a second wing joined at one long edge to the inner edge of the first wing by means of bendable strips and having at its other long edge a flange bent inwardly at right angles thereto, a screw adapted to extend through said second wing and into said screw-threaded hole, the first wing having an opening therein for the passage of conductors, the said wings initially making an obtuse angle with each other and the parts being of such dimensions that the second wing may be drawn into a position at right angles to the first mentioned wall with its flange flat against said wall without moving the first wing.

9. A clamping member for securing a conduit or the like to a box through a wall of which it enters, comprising a piece of sheet metal cut and bent along a transverse line to form two wings lying at an obtuse angle to each other, the inner edge of one wing being spaced apart from the second wing and being connected thereto by narrow strips, said second wing having openings therethrough to permit the passage of conductors, and the other wing having a hole for receiving a fastening.

10. A clamping member for securing a conduit or the like to a box through a wall of which it enters, comprising two wings spaced apart from each other and arranged at an obtuse angle to each other, short, curved, narrow, bendable elements extending between and connecting said wings together at the angle of said member and holding the adjacent edges of the wings apart from each other, the first of said wings being tangential to said curved elements and the second wing lying at an angle to a plane tangent to said elements and passing through the juncture of said elements with said second wing, the first wing having at least one opening to permit a conductor to be passed through the same, and the other wing having an opening to receive a fastening for holding the clamping member to the box.

11. A clamping member for securing a conduit or the like to a box, comprising two wings arranged at an obtuse angle to each other, the first wing being adapted to rest on and stand at right angles to the bottom wall of the box and the other wing being adapted to engage at its free edge with a side wall of the box, a tongue on the first wing for engaging a hole in the bottom of the box, a screw passing down through the second wing and adapted to be screwed into the bottom of the box to draw the second wing down upon a conduit entering the box underneath the same, said wings being spaced apart from each other, and short, narrow, bendable elements extending between the adjacent edges of said wings and securing the wings together, said elements being curved in such a manner that, when the second wing is drawn down into parallelism with the bottom wall of the box, the radius of curvature of said elements becomes shorter and thus permits the first wing to remain at approximate right angles to the bottom of the box.

In testimony whereof, I sign this specification.

WILLIAM GOETZELMAN.